Patented July 25, 1944

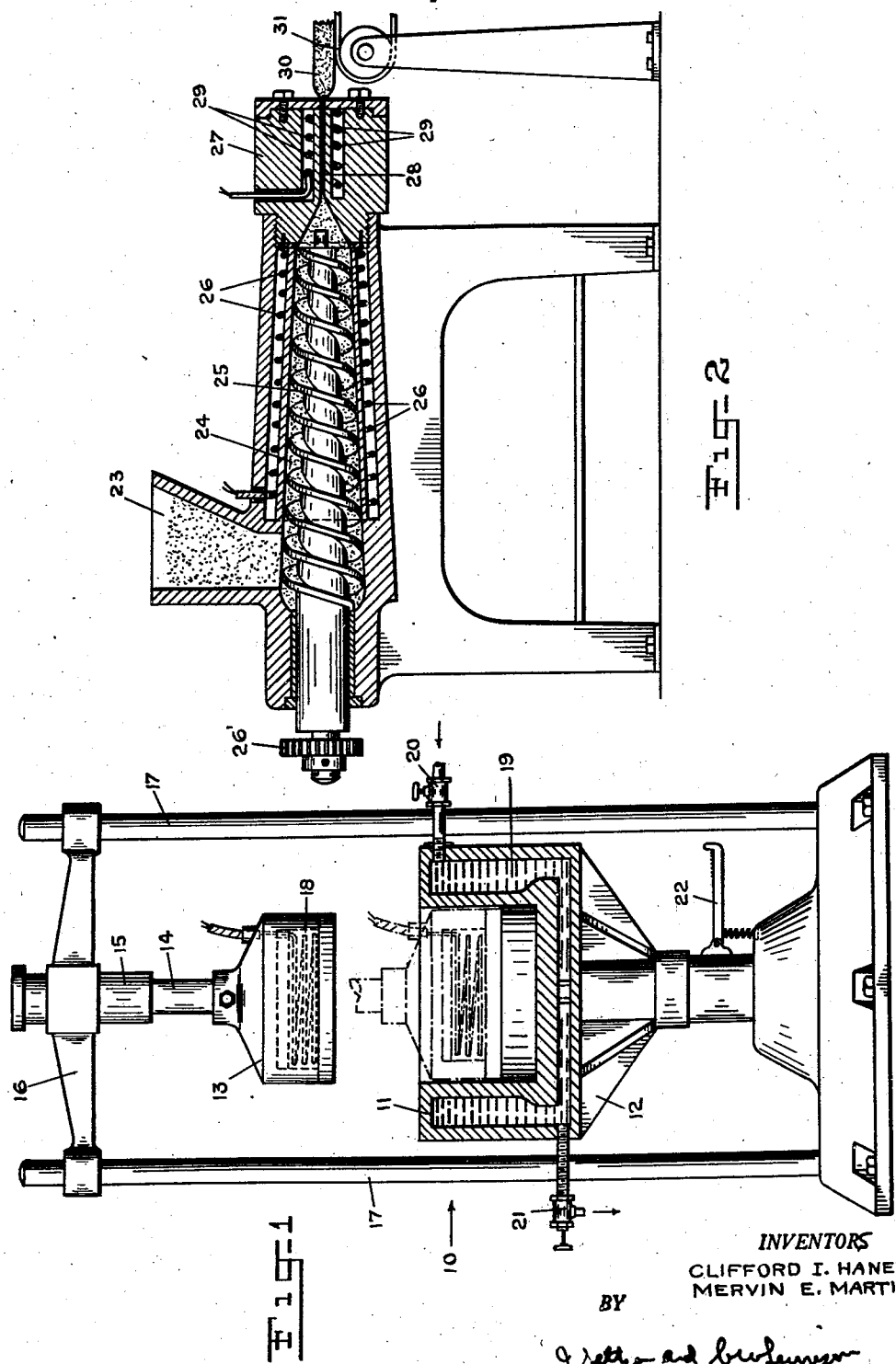

2,354,260

UNITED STATES PATENT OFFICE 2,354,260

CELLULAR MATERIAL

Clifford I. Haney and Mervin E. Martin, Cumberland, Md., assignors to Celanese Corporation of America, a corporation of Delaware Application April 26, 1941, Serial No. 390,542

8 Claims. (Cl. 18—48)

This invention relates to cellular materials, and relates more particularly to cellular materials having a basis of a derivative of cellulose.

An object of our invention is the preparation of cellular materials having a basis of a derivative of cellulose.

Another object of our invention is the preparation of said cellular materials in a rapid and economical manner and in any desired predetermined manner.

Other objects of our invention will appear from the following detailed description and the accompanying drawing.

In the drawing,

Fig. 1 is a front elevational view, partly in section, showing a molding press adapted to produce the cellular materials of our invention in the form of cakes or blocks, and Fig. 2 is a side elevational view, partly in section, of a screw feed extrusion device for extruding said cellular materials in a continuous form.

Like reference numerals indicate like parts throughout the several views of the drawing.

The preparation of cellular materials having a basis of a derivative of cellulose has been proposed and methods whereby these materials may be prepared have been suggested. In accordance with one method, a solution of a derivative of cellulose in a volatile solvent is prepared and inorganic salts of appreciable particle size are mixed therewith. After the solution has been suitably shaped and then set by removal of the solvent, the soluble salts are extracted with water from the body of the shaped cellulose derivative leaving behind a cellular mass or structure. The disadvantage of this process is that repeated extractions are necessary in order to remove the salts, and their complete removal is a lengthy and costly operation. In addition, the resulting cellular structure is not satisfactory for many purposes.

We have now discovered that low density, cellular materials having a basis of a derivative of cellulose may be prepared rapidly and economically by adding to said derivatives of cellulose when in finely-divided form, a volatile liquid which has in the vapor state at least a solvent, swelling or softening action thereon, subjecting the treated material to elevated temperature and pressure in a closed chamber, and, then, after the cellulose derivative particles are at least partially converted, quickly releasing the pressure therefrom. The sudden release of the pressure while the treated material is at an elevated temperature allows the liquid absorbed therein to vaporize with extreme rapidity and the cellulose derivative is expanded to a strong, firm, cellular material of low density and even texture.

Various liquids and liquid mixtures having a solvent, softening or swelling action on the derivatives of cellulose in the vapor state (all of which are included in the term "having at least a swelling action" as used hereinafter in the claims), may be used in the preparation of these cellular materials. Examples of the liquids or liquid mixtures which may be employed are acetone, ethyl alcohol, ethyl alcohol and benzol, water, chloroform, ethylene dichloride, acetone and ethyl or methyl alcohol, ethylene dichloride and ethyl or methyl alcohol, methyl chloride and ethyl or methyl alcohol, butyl alcohol, diacetone alcohol, and gasoline hydrocarbons, as well as mixtures of the organic liquids with various amounts of water. While all these liquids are suitable, we preferably use either acetone, ethyl alcohol, and mixtures of these liquids with water or benzol.

The liquids may be applied to the finely divided cellulose derivatives in various ways. The desired quantity of liquid or liquid mixture may be sprayed or sprinkled on to the cellulose derivative which may be in the form of small particles or fibers and the mixture tumbled until the liquid is uniformly distributed throughout the mass. Alternatively, the cellulose derivative particles or fibers may be exposed to the vapors of the solvent, softening or swelling liquid or liquid mixture until the desired quantity is absorbed therein, thereby obtaining a thorough distribution without the necessity for tumbling. Where desired a combination of both methods may be used. Satisfactory results may be obtained if from 1% to 40% of the solvent, softening or swelling agent is incorporated into the cellulose derivative material. Preferably, however, we employ from 3% to 20% on the weight of the fibers.

Conveniently, the finely divided cellulose derivative having the liquid dispersed therein may be subjected to heat and pressure in any molding device wherein the temperature may be suitably controlled and wherein the pressure may be quickly released. Thus, a molding press may be used and the pressure may be applied to the finely divided cellulose derivative material by placing said material in a suitably shaped mold and applying pressure thereto by means of a piston or plunger shaped to conform to the mold. Upon a sudden release of the pressure, the rapid expansion and vaporization of the liquid absorbed in the mass causes the cellulose derivative material to expand greatly to a firm cellular structure which fills the mold. By utilizing a suitably shaped mold, the expanded cellular material may be obtained in any desired form or shape. If desired, the cellulose derivative material under high pressure may be extruded through suitably shaped orifices and in this way cellular sheets, tubes, rods, etc., may be obtained. When extruded into suitably shaped molds other shapes may be obtained depending upon the particular shape of the mold.

The pressure may be applied to the mold by mechanical means, by hydraulic means or by air or other gas under pressure. The pressure to which the material may be subjected will vary depending upon the final product desired and may, for example, be from 1,000 to 20,000 lbs. per sq. inch. Preferably, however, the cellulose derivative materials are subjected to pressures of somewhat over 5,000 lbs. per sq. inch, i. e. about 6,000 lbs. per sq. inch and the pressure then suddenly released to normal atmospheric pressure.

The heating of the mold or pressure chamber may be accomplished in any convenient manner such, for example, as by steam or oil heating jackets surrounding the mold or pressure chamber, by heating the pressure chamber with gas flames, or by using electrical resistance coils. The temperature to which the finely divided material is heated will, of course, depend upon the amount of pressure applied and the time during which the material is maintained under said pressure. The temperature should be below the decomposition temperature of the particular cellulose derivative being molded and may generally be from 140° C. to 250° C. Particularly desirable results are obtained with cellulose acetate, for example, by heating to about 200° C. The material may be placed in a cool mold or pressure chamber, then subjected to pressure therein and the mold or pressure chamber may then be brought up to the desired temperature and maintained at that temperature for the period of time desired. If desired, the heat may be applied while the pressure is being put on. In this way, objects of very low density may also be obtained.

When high pressures and temperatures are employed, the time during which the cellulose derivative material is subjected to these conditions is relatively short. Maintaining the mold or pressure chamber closed for from ½ to 5 minutes may be ample, depending upon the size or thickness of the object being fabricated. Generally, a heating time from about 5 to 15 minutes is satisfactory.

Examples of cellulose derivatives that may be employed in the production of the cellular articles of the present invention are cellulose esters, for example, cellulose acetate, cellulose propionate, cellulose butyrate, and mixed esters such as cellulose acetate-propionate and cellulose acetate-butyrate, inorganic esters such as cellulose nitrate, preferably of low nitrogen content, and cellulose ethers such as ethyl cellulose and benzyl cellulose. Mixtures of one or more of the above substances may also be employed. Where cellulose acetate is used, it may have an acetyl value of from 40 to 62.5% (determined as acetic acid).

In order to increase the strength or to modify the appearance or properties of the objects being molded or extruded, fibrous or other fillers may be incorporated therein. Examples of such fibrous fillers are fibers of cotton, flax, hemp, ramie, jute and natural silk, while examples of other filling materials are cork, sawdust, wood shavings, clay, asbestos, etc., or mixtures of these.

In addition, pigments may be incorporated in the material or the material may be dyed to obtain color effects. The cellulose derivatives may be treated with suitable plasticizers before they are expanded. Any suitable plasticizer may be employed such as, for example, dimethyl phthalate, diethyl phthalate, dibutyl tartrate, triphenyl phosphate, tricresyl phosphate, dibutyl phthalate and mono-ethyl-p-toluene sulfonamide.

The products made in accordance with our invention may be put to a large variety of uses. Due to their low density, the materials are very useful as heat insulating material in refrigerators and in pipe coverings, and due to their porosity they may be used as a structural sound proofing material. They may also be used for covering or insulating electrical equipment, or, when made into relatively thin discs or sheets, may be used for filtration purposes. When the pores are sealed up by treating the surface of the expanded material with a solvent, or by heating said material to cause the surfaces to coalesce, the material resists penetration by water and the high proportion of air sealed therein lends an extreme buoyancy to the material thus making it suitable for use in life belts and life rafts to replace other materials which lose their buoyancy after long contact with water. Not only may the material be sealed as above, but it may also be sealed by inserting thin sheets of unplasticized organic derivatives of cellulose above and below the charge before closing the mold and then allowing the material to expand as described.

In the drawing there are shown devices whereby the cellular materials of our invention may be prepared.

In Fig. 1 there is shown a molding press, generally indicated by reference numeral 10, comprising a heated mold 11 set on a suitable support 12 and a reciprocating, heated, pressure head 13, the latter being mounted on a piston 14 which operates under hydraulic pressure exerted in chamber 15. The length of the stroke of the piston 14 is variable and may be adjusted as desired by changing the position of the cross-head 16, which carries said piston, along the vertical supports 17. The cross-head 16 may be locked at the desired level by suitable means (not shown). Pressure head 12 is heated by an electrical resistance coil 18, while mold 11 is heated by means of hot oil circulated through a heating jacket 19 surrounding the mold, the hot oil entering through an inlet 20 and discharging through an outlet 21. Other suitable heating means may, of course, be employed.

In operation of the device shown in Fig. 1, the pressure head 13 is forced down by piston 14 into the previously filled mold 11, and the combined action of heat and pressure serves partially to convert the cellulose derivative contained therein. The hydraulic pressure is then suddenly released which allows the pressure head 13 to rise as the cellulose derivative material expands. The vertical movement of the piston is limited by the position of cross-head 16 and this limitation on the movement of the piston determines the ultimate thickness of the cellular cake or block which is formed. The cake may be discharged from the mold by means of a foot lever 22.

In Fig. 2, wherein an extrusion device is shown, said device comprises a hopper 23, in which the cellulose derivative material may be charged, communicating with a tapering passageway 24 containing a rotating stuffing screw 25. The screw 25 is suitably driven as by a chain drive 26' and the rotation of said screw carries the cellulose derivative material forward. The passageway is heated as by electrical resistance coils 26. The taper of the passageway causes the pressure to increase gradually as the cellulose derivative material moves forward and the latter is finally forced under very high pressure into a heated discharge nozzle 27 provided with a narrow opening 28. The nozzle 27 is likewise heated to the desired temperature by means of electrical resistance coils 29. As the cellulose derivative material is discharged, the sudden release of pressure permits the material to expand suddenly to form a cellular rod 30. The latter is carried away on a moving belt 31.

In order further to illustrate our invention, but without being limited thereto, the following examples are given:

Example I

Cellulose acetate fibers having an acetyl value of 53.5 to 54% are thoroughly pulped and the dried fibers are then exposed to acetone vapors by suspending the material over acetone in a closed chamber for 6 hours at 22° C. By this treatment the fibers absorb about 5% of their weight of acetone. Approximately 15 parts by weight of the treated material is then placed in a molding press provided with circular mold after the mold has been heated to 200° C. by means of electrical resistance coils. The mold is then closed and a pressure of 6,000 lbs. per sq. inch is applied to the cellulose acetate. After this pressure has been maintained for 10 minutes, the pressure is suddenly released and the cellulose acetate expands to form a cellular white cake of smooth, external surface and firm texture, having a density of 0.21. When the pressure is maintained on the material for 15 minutes before it is released, a product having a density of 0.27 is obtained.

Example II

Cellulose acetate fibers having an acetyl value of 53.5 to 54% are pulped and dried and 10% by weight of a mixture of equal parts of acetone and water is sprayed on to the fibers. The treated fibers are then tumbled for 1 hour. After standing in a closed container for about 24 hours, 15 parts by weight of the treated fibers are placed in the cold mold of a molding press and a pressure of 6,000 lbs. per sq. inch is applied to the fibers. The temperature is slowly raised to 200° C. and after being maintained at that temperature for 5 minutes the pressure is suddenly released and the cellulose acetate allowed to expand. The resulting cellular cake is of firm texture and of pithy appearance, and has a density of 0.10.

Example III

Cellulose acetate fibers having an acetyl value of 54 to 54.5% are pulped and dried and 10% by weight of a mixture of equal parts of acetone and water is sprayed on to the fibers. The moist fibers are tumbled for 1 hour until the liquid is evenly distributed throughout the mass. After being permitted to stand in a closed container for about 24 hours, 15 parts by weight of the treated fibers are placed in the hot mold of a molding press which has been heated to 200° C. The press is closed and a pressure of 6,000 lbs. per sq. inch is applied to the cellulose acetate. This pressure is maintained for 5 minutes and the mold is then opened quickly and the cellulose acetate allowed to expand. The cellular cellulose acetate is a firm mass having a smooth surface, and has a density of 0.12. When the press is closed for 15 minutes before the pressure is released, a material having a density of 0.19 is obtained.

Example IV

Cellulose acetate having an acetyl value of 54.5% is ground to pass a 40 mesh screen and 15% by weight of water is sprayed on to the particles. The moist particles are tumbled for 8 hours until the liquid is evenly distributed throughout the mass. 10 parts by weight of the treated particles are placed in the hot mold of a molding press which has been heated to 200° C. and a pressure of 6,000 lbs. per sq. inch is applied to the mass. After this pressure has been maintained for 5 minutes, the pressure is suddenly released and the cellulose acetate expands to a cellular mass having a density of 0.129.

Example V

Cellulose acetate fibers having an acetyl value of 54.5% are pulped and dried and 5% by weight of a mixture of equal parts of ethyl alcohol and benzol is sprayed on to the fibers. The fibers are tumbled for 3 hours. 10 parts by weight of the treated fibers are placed in the hot mold of a molding press heated to 200° C., a pressure of 6,000 lbs. per sq. inch is applied to the mass and after being maintained for 5 minutes is suddenly released. The cellulose acetate expands to a firm, cellular cake having a density of 0.12.

Example VI

Cellulose acetate having an acetyl value of 54.5% is ground to pass a 40 mesh screen and 15% by weight of ethyl alcohol is sprayed on to the particles. The moist particles are tumbled for 3 hours until the liquid is evenly distributed throughout the mass. 10 parts by weight of the treated particles are placed in the hot mold of a molding press which has been heated to 180° C. and a pressure of 6,000 lbs. per sq. inch is applied to the mass. After this pressure has been maintained for 5 minutes, the pressure is suddenly released and the cellulose acetate expands to a firm cellular mass having a density of 0.086.

Example VII

Cellulose acetate having an acetyl value of 40% and in a finely divided form is treated with water and tumbled so that a uniform mixture containing 5% of water based on the weight of the material is obtained. About 10 parts by weight of this material is placed in the hot mold of a molding press heated to 160° C. and a pressure of 6,000 lbs. per sq. inch is applied to the mass. This pressure is maintained for 1 minute and is then suddenly released. The cellulose acetate expands when the pressure is released and forms a firm, cellular mass having a density of 0.28.

It is to be understood that the foregoing detailed description is merely given by way of illustration and that many variations may be made therein without departing from the spirit of our invention.

Having described our invention, what we desire to secure by Letters Patent is:

1. Method of making cellular articles of low density containing cellulose acetate, which comprises forming a mixture of particles of cellulose acetate containing 15% by weight of ethyl alcohol, subjecting said mixture to the action of elevated temperature at which ethyl alcohol normally exists in the vapor state and a pressure of about 6,000 lbs. per square inch and then quickly releasing the pressure.

2. Method of making cellular articles of low density containing cellulose acetate, which comprises forming a mixture of particles of cellulose acetate containing 5% by weight of acetone, subjecting said mixture to the action of elevated temperature at which acetone normally exists in the vapor state and a pressure of about 6,000 lbs. per square inch and then quickly releasing the pressure.

3. Method of making cellular articles of low density containing cellulose acetate, which comprises forming a mixture of particles of cellulose acetate containing 5% by weight of water, subjecting said mixture to the action of elevated temperature at which water normally exists in the vapor state and a pressure of about 6,000 lbs. per square inch and then quickly releasing the pressure.

4. Method of making cellular articles of low density containing thermoplastic derivatives of cellulose, which comprises forming a mixture of particles of a thermoplastic derivative of cellulose and a liquid which, under the conditions of temperature and pressure employed, has at least a swelling action on the derivative of cellulose, subjecting said mixture to the action of elevated temperature at which said liquid normally exists in the vapor state and a pressure of at least 1,000 pounds per square inch, the amount of liquid employed being from 1 to 40% on the weight of the cellulose derivative, and then quickly releasing the pressure.

5. Method of making cellular articles of low density containing cellulose acetate, which comprises forming a mixture of particles of cellulose acetate and a liquid which, under the conditions of temperature and pressure employed, has at least a swelling action on the cellulose acetate, subjecting said mixture to the action of elevated temperature at which said liquid normally exists in the vapor state and a pressure of at least 1,000 pounds per square inch, the amount of liquid employed being from 1 to 40% on the weight of the cellulose acetate, and then quickly releasing the pressure.

6. Method of making cellular articles of low density containing thermoplastic derivatives of cellulose, which comprises forming a mixture of particles of a thermoplastic derivative of cellulose and a liquid which, under the conditions of temperature and pressure employed, has at least a swelling action on the derivative of cellulose by exposing said cellulose derivative particles to the action of vapors of said liquid so that said vapors are absorbed thereby, subjecting said mixture to the action of elevated temperature at which said liquid normally exists in the vapor state and a pressure of at least 1,000 pounds per square inch, the amount of liquid employed being from 1 to 40% on the weight of the cellulose derivative, and then quickly releasing the pressure.

7. Method of making cellular articles of low density containing cellulose acetate, which comprises forming a mixture of particles of cellulose acetate and a liquid which, under the conditions of temperature and pressure employed, has at least a swelling action on the cellulose acetate by exposing said cellulose acetate particles to the action of vapors of said liquid so that said vapors are absorbed thereby, subjecting said mixture to the action of elevated temperature at which said liquid normally exists in the vapor state and a pressure of at least 1,000 pounds per square inch, the amount of liquid employed being from 1 to 40% on the weight of the cellulose acetate, and then quickly releasing the pressure.

8. Method of making cellular articles of low density containing cellulose acetate, which comprises forming a mixture of particles of cellulose acetate and a liquid which, under the conditions of temperature and pressure employed, has at least a swelling action on the cellulose acetate, subjecting said mixture to the action of elevated temperature at which said liquid normally exists in the vapor state and a pressure of at least 1,000 pounds per square inch, the amount of liquid employed being from 1 to 40% on the weight of the cellulose acetate, and then extruding the said material so that the pressure thereon is quickly released, whereby a cellular material is formed.

CLIFFORD I. HANEY.
MERVIN E. MARTIN.